United States Patent [19]
Choi

[11] Patent Number: 6,045,597
[45] Date of Patent: Apr. 4, 2000

[54] PLEATED FILTER WITH SPACER INSERT

[75] Inventor: Kyung-Ju Choi, Louisville, Ky.

[73] Assignee: AAF International Inc., Louisville, Ky.

[21] Appl. No.: 09/100,985

[22] Filed: Jun. 22, 1998

[51] Int. Cl.[7] .................................................. B01D 27/06
[52] U.S. Cl. ................ 55/483; 55/484; 55/497; 55/501; 55/527; 210/493.5; 210/494.3
[58] Field of Search ............... 55/483, 484, 487, 55/497, 501, 506, 527; 210/493.5, 497.2, 494.3, 498

[56] References Cited

U.S. PATENT DOCUMENTS

| | | |
|---|---|---|
| 2,907,408 | 10/1959 | Engle et al. ............................ 55/497 |
| 3,344,590 | 10/1967 | Smith et al. . |
| 3,691,735 | 9/1972 | Neumann . |
| 4,056,375 | 11/1977 | Ringel et al. . |
| 4,227,953 | 10/1980 | Wasielewski . |
| 4,874,517 | 10/1989 | Esch . |
| 5,066,400 | 11/1991 | Rocklitz et al. . |
| 5,084,178 | 1/1992 | Miller . |
| 5,273,563 | 12/1993 | Pasch et al. .......................... 55/497 |
| 5,273,564 | 12/1993 | Hill ...................................... 55/497 |
| 5,306,321 | 4/1994 | Osendorf . |
| 5,743,927 | 4/1998 | Osendorf ............................... 55/501 |
| 5,744,036 | 4/1998 | Choi . |
| 5,800,585 | 9/1998 | Choi .................................... 55/483 |
| 5,888,262 | 3/1999 | Kahler ................................. 55/497 |

*Primary Examiner*—David A. Simmons
*Assistant Examiner*—Minh-Chau T. Pham
*Attorney, Agent, or Firm*—Polster, Lieder, Woodruff & Lucchesi

[57] ABSTRACT

A pleat filter medium assembly wherein pleated fibrous filter medium forming troughs between opposed faces of adjacent filter medium pleats serve to include spacer inserts formed from intersecting sets of spaced strands of different cross-sectional thickness.

26 Claims, 3 Drawing Sheets

PLEATED FILTER WITH SPACER INSERT

BACKGROUND OF THE INVENTION

The present invention relates to a unique and novel pleated filter media arrangement and method of assembly and more particularly to a unique and novel pleated filter arrangement and assembly method which includes at least one sheet of pleated porous filter medium with unique pleat spacer inserts between adjacent pleats and a unique method of assembling the pleated filter medium with spacers therebetween.

Spacer structures between adjacent porous filter media pleats are generally well known in the fluid filtration art. These past structures include various arrangements for providing spacer inserts between sheets of pleated porous filter media, such as in U.S. Pat. No. 3,344,590, issued Oct. 3, 1967 to T. R. Smith et al; U.S. Pat. No. 3,691,736, issued Sept. 19, 1972 to G. M. Neumann; U.S. Pat. No. 3,941,571, issued Mar. 2, 1976 to A. R. Getzin; U.S. Pat. No. 4,056,375, issued to W. Ringel et al on Nov. 1, 1977, U.S. Pat. No. 4,227,953, issued Oct. 14, 1980 to S. J. Wasielewski et al; U.S. Pat. No. 4,874,517, issued Oct. 17, 1989 to H. W. Esch; and, U.S. Pat. No. 5,084,178, issued Jan. 28, 1992 to J. D. Miller et al. Other prior art patents have relied upon displacements in the filter media itself rather than spacer inserts—such as can be seen in U.S. Pat. No. 5,066,400, issued on Nov. 19, 1991 to G. J. Rocklitz et al; U.S. Pat. No. 5,306,321, issued on Apr. 26, 1994 to R. J. Osendorf; and, U.S. Pat. No. 5,744,036, issued on Apr. 28, 1998 to Kyung-Ju Choi. Further, soon to issue copending patent application No. 08/832,514 by Kyung-Ju Choi teaches supporting pocket netting having sufficient stiffness and rigidity to support a preselected pocket weight per given unit area.

For the most part, the past spacing arrangements have been comparatively complex and expensive in manufacture of the several parts involved and in the assembly of such parts. Further, these past spaced arrangements have presented comparatively high resistances and concomitant pressure drops in the treated fluid stream along with reduced filtering areas in given units of space.

The present invention provides a unique and novel spacer insert arrangement for pleated filter media sheets which is economical and straightforward in manufacture and assembly, requiring a minimum of parts, allowing for a minimum of pressure drop across the filter media and optimizing the filtering surface in a given space, enhancing pleated filter media spacing and fluid stream flow therethrough. In addition, the present invention provides a unique method and apparatus which is straightforward and economical with a minimum of parts and a minimum of steps for assembling the novel filter arrangement.

Various other features of the present invention will become obvious to one skilled in the art upon reading the disclosure set forth herein.

BRIEF DESCRIPTION OF THE INVENTION

More particularly, the present invention provides a pleated filter arrangement for removing particulate matter from a fluid stream comprising; at least one sheet of porous filter medium having opposed faces and being pleated into a plurality of longitudinally extending spaced pleats of porous filter medium; a plurality of longitudinally extending, flow-through, screen-like inserts, each insert including a body portion sized to be inserted into nesting relation with and engaging between opposed faces of adjacent pleats of porous filter medium to separate the adjacent pleats, the body portion of the inserts including spaced strands of preselectively differing cross-sectional thicknesses with at least certain of which extend in transversely crossing relation and arranged to enhance pleated filter medium spacing and particulate carrying fluid stream flow therethrough. In addition, the present invention provides a unique method of forming a pleated filter comprising: passing a flat strip of filter medium of preselected width into a pleating zone to pleat the filter medium into adjacent pleats having opposed faces of preselected depth with troughs therebetween; passing the pleated filter medium from the pleating zone into a spacer zone to insert a screen-like spacer member having spaced strands into each of the troughs with the spaced strands having differing preselected cross-sections and positioned between opposed faces of adjacent pleats to maximize fluid flow therethrough; and passing the spacer inserted pleated filter medium from the spacer insert zone to a severing zone to separate unit spacer-inserted filter medium into preselected lengths.

It is to be understood that various changes can be made by one skilled in the art in one or more of the several parts and in one or more of the several steps of the inventive arrangement and method disclosed herein without departing from the scope or spirit of the present invention. For example, the geometry of each pleat and differing spacer strands can be varied, as can the materials employed, without departing from the inventive pleated filter arrangement and method of forming the same.

BRIEF DESCRIPTION OF THE DRAWINGS

Referring to the drawings which disclose one advantageous embodiment of the present invention and two modification thereto.

DETAILED DESCRIPTION OF THE DRAWINGS

Figure 1:
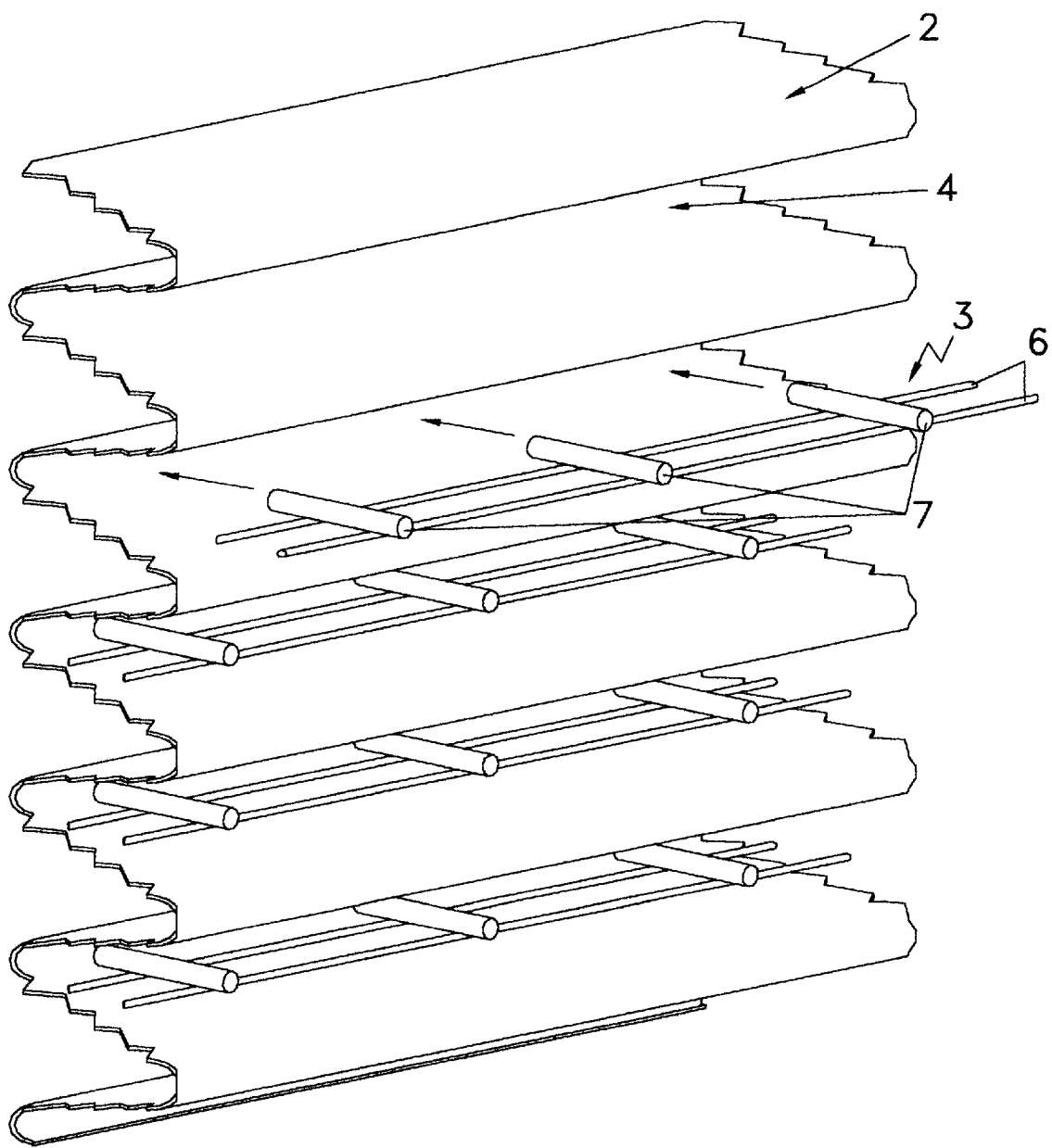
FIG. 1 is an isometric, exploded, partial view of a portion of the novel pleated filter medium with spacers disposed to be inserted between troughs formed by opposed filter medium faces of adjacent pleats.

Referring to FIG. 1 of the drawings, it can be seen that the novel pleated filter medium arrangement for removing particulate matter from a fluid stream comprises at least one sheet of pleated porous filter medium 2 which can be of a preselected width and of a suitable fibrous filtering material-such as a natural fiber, a spun or chopped glass, a synthetic polymeric fiber or a suitably preselected combination of fibers. Advantageously, the selected media is pleated into a plurality of longitudinally extending spaced pleats with valley depths in the range of one half to four inches (½"–4") with a spacing between adjacent pleat crests in the approximate range of zero point zero five to zero point five inches (0.05"–0.5").

In accordance with one feature of the present invention, individual screen-like, flow-through spacer inserts 3 of a length in the approximate range of six to seventy-two inches (6"–72") and advantageously of twenty-four inches (24") are inserted in the troughs 4 formed between opposed faces of adjacent filter medium pleats. The spacers 3 can be formed from anyone of a number of suitably selected spaced strands of synthetic material. It advantageously can be formed from strands of a suitable selectively sheathed core of extruded material having appropriate rigidity and bonding characteristics so as to provide stable pleat spacing and yet allow bondability to the media. For example, a strand composed of polypropylene core surrounded or sheathed by a polyethylene vinyl acetate or an appropriate polyethylene would serve the purpose. Further, synthetic strands coated with a suitable adhesive could be used. Spacer inserts 3 can be bonded to at least one face of each pleat so as to be in spaced relation from immediately preceding and successive crests on either side of the pleated material a distance of approximately zero point one three inches (0.13").

In accordance with still another feature of the present invention, each spacer insert 3 is composed of a set of spaced longitudinally extending thin strands 6 and a set of spaced thick strands 7 of suitably selected material. In on advantageous embodiment of the present invention, each of the larger spaced strands can have a cross-sectional diameter in the range of approximately one thirty second of an inch (1/32") to one fourth of an inch (¼") and, advantageously of approximately one twenty-fourth of an inch (1/24") and spaced from each other a distance of approximately one inch (1") with the cross-sectional diameter of each of the thin strands being approximately in the range of one-tenth (1/10) to one half (½) the diameter of the outer larger strands 7 and spaced from each other a distance of approximately zero point five (0.5").

In FIG. 1, longitudinally extending thin strands 6 extend parallel to the crests of pleated medium 2 and are fastened or bound to at least one face of the pleats with thick strands 7 which extend normally transverse strands 6 so that the pleat crests are spaced from the pleat faces to enhance fluid stream flow through filter medium 2 and to minimize the pressure drop through filter medium 2. It is to be understood that the sets 6 and 7 of spaced strands forming spacer inserts 3 can be arranged to cross and be fastened to each other at other preselected angles than as shown in the drawings in order to accomplish a desired flow-through result; however, the specific normal strand crossing arrangement as shown in FIG. 1 not only serves to enhance uniform, laminar flow through the filter pleats and minimize pressure drop but also serves to insure preselected pleat spacing to provide troughs 4 of a preselected breadth and depth. In this regard, although only two sets of spaced strands 6 and 7 are shown, it is to be understood that a third set of strands (not shown) can be provided in spaced opposed relation from the first sets of strands 6 and 7 to cross and be fastened to strand set 7 opposite the first strand set 6 and to then be fastened to the opposite face of an adjacent pleat.

Figure 2:
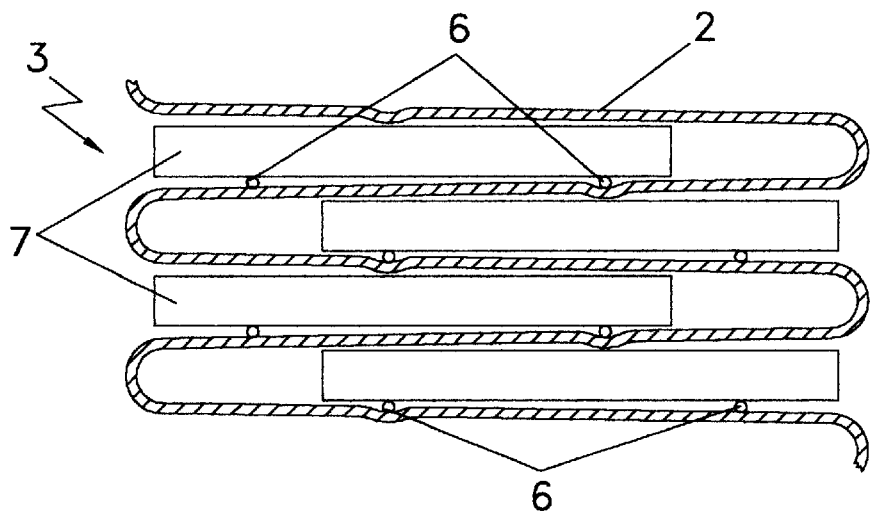
FIG. 2 is an enlarged cross-sectional, partial view of the pleated arrangement of FIG. 1, disclosing spaced, longitudinally extending spacer strands in transversely crossing relationship: the crossing strands being of differing cross-sectional thickness.
Figure 3:
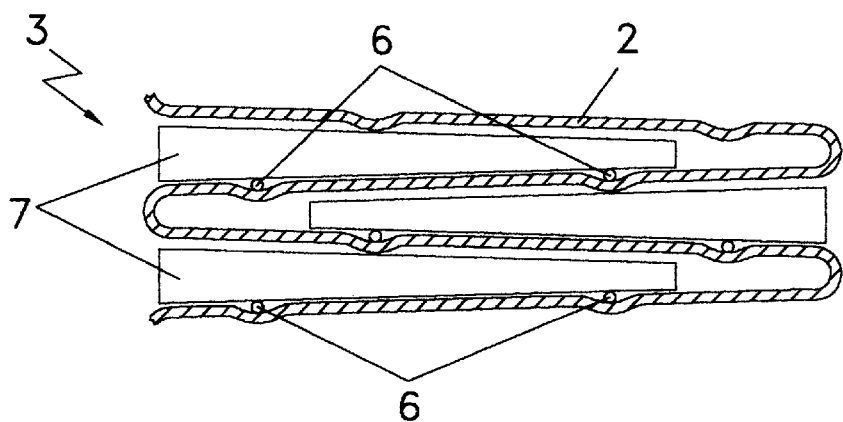
FIG. 3 is an enlarged cross-sectional partial view similar to the view of FIG. 2, disclosing spaced, longitudinally extending spacer strands in transversely crossing relationship, the crossing strands being of differing cross-sectional thickness with the set of spacer strands of larger cross-section being of longitudinally tapered configuration to enhance nesting relationship in the tapered troughs formed between opposed filter medium faces of adjacent pleats.
Figure 4:
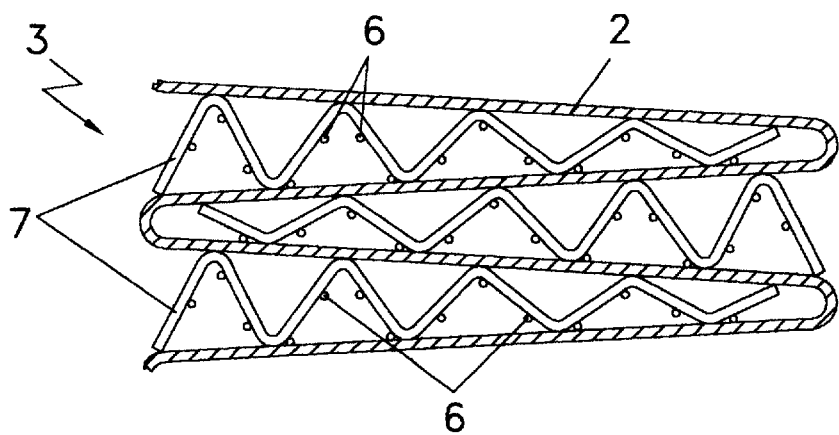
FIG. 4 is a cross-sectional, partial view of a screen-like spacer arrangement in which the spacer itself is of tapered and corrugated overall cross-sectional configuration; and, FIG. 5 is a schematic flow diagram, illustrating schematically the several steps in accomplishing the novel method of the present invention.

In FIGS. 2 and 3 of the drawings, pleat inserts 3 are shown as being comprised of only two thin and thick crossing strand sets 6 and 7, respectively, with the strands of the crossing sets abutting opposed faces of adjacent pleats of pleated filter medium 2. It is to be understood that both sets of strands can be fastened to the opposed pleat faces by a suitable adhesive or in a suitable fusing manner, as described hereinafter. Moreover, it is to be understood that only one set of strands can be fastened to an adjacent media face or each insert 3 can be arranged to "float" in the trough into which it has been inserted. Further, as can be seen in FIGS. 3 and 4 of the drawings, a longitudinally extending, tapering insert arrangement can be provided by either tapering one of the longitudinally extending strand sets in a manner as shown in FIG. 3 wherein thick strands 7 are disclosed as varying in cross-section or by corrugating and longitudinally tapering the entire insert as shown in FIG. 4.

Figure 5:
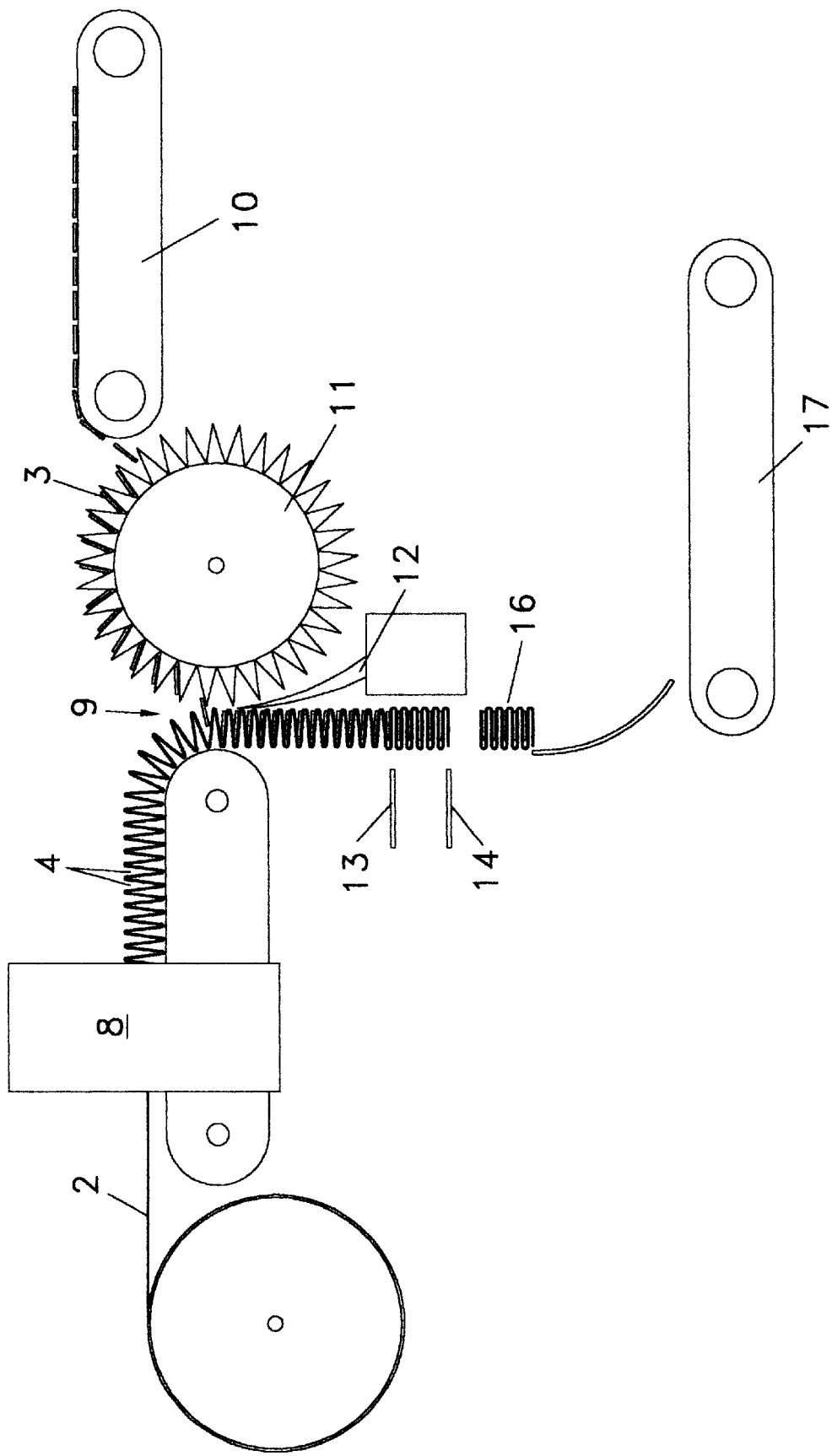

Referring to FIG. 5 of the drawings, a novel method of forming the inventive pleated filter medium is schematically disclosed. This novel and unique method includes the steps of passing a flat strip of fibrous filter medium 2 of a preselected width or breadth into pleating zone 8 to pleat the fibrous filter medium 2 into adjacent pleats having opposed faces, the pleats being of preselected depth with troughs 4 therebetween. It is to be understood that any one of several filter medium pleating machines known in the filter machine art can be utilized to accomplish the medium pleating, including opposed reciprocally engaging dies or spaced meshing teeth of adjacent meshing rollers, as is known in the pleating art. The pleats are then passed from the pleating zone 8 into a spacer insert zone 9 where a suitable spacer carrier, here shown as an endless belt (10) and peripherally recessed roller 11 inserts spacer inserts 3, which spacer inserts can be of an inventive arrangement as above described to include transversely crossing sets of spaced thin and thick strands 6 and 7, respectively. Each spacer unit 3 is inserted from its roller recess into a pleat trough 4 and, assuming that at least one or both the filter medium 2 and spacer units 3 are of meltable material, a hot gas such as air is applied to each spacer unit 3 by an ejector 12, during or immediately after it is inserted into its respective trough 4. Advantageously, the spacer inserts can be so inserted in the troughs to be in spaced relation from an immediately adjacent crest in one embodiment of the invention. With the described arrangement and depending upon the applied area of fusion, each spacer insert 3 adheres to either or both opposed faces of adjacent filter medium pleats forming the troughs 4. A reciprocating compression arm 13 is suitably positioned downstream of the spacer insert zone 9 to be reciprocally inserted into the path of the spacer loaded filter medium, serving to allow the pleats to compress and the melt to set and fasten against opposed pleat faces. By compressing the pleats, the number of pleats per unit area are optimized so as to maximize filter area with the distance between opposed faces of the pleats being sufficient to allow ready nesting and engagement of the spacer inserts between adjacent pleats. It is to be understood that instead of a hot gas melt to fasten the spacer inserts to the pleat faces, any one of a number of suitable adhesive materials can be appropriately applied to the spacer inserts 3 to selectively fasten them in their respective pleat troughs or, if desired, the spacer inserts can be free of adhesion and allowed to "float" in the pleat troughs.

After spacer insertion and compression (it elected), the spacer loaded pleated filter medium strip passes to a unit severing zone 14, which and be either a mechanical or laser shear, as is known in the art, where filter units 16 are severed to a preselected length and carried by endless conveyor 17 for suitable unit framing, as the case might be.

The invention claimed is:

1. A pleated filter medium arrangement for removing particulate matter from a fluid stream comprising: at least one sheet of porous filter medium having opposed faces and being pleated into a plurality of longitudinally extending spaced pleats of porous filter medium providing troughs between opposed filter medium faces of adjacent pleats; a plurality of longitudinally extending flow through individual and separate spacer inserts, each insert including a longitudinally extending body portion sized to be inserted into nesting relation with and engaging in one of said troughs between said opposed faces of adjacent pleats of porous filter medium to extend longitudinally substantially along the length of said trough to separate said adjacent pleats, said longitudinally extending body portions of said spacer inserts, each including spaced strand sets of preselectively differing cross-sectional thickness with at least certain of which extend in transversely crossing relation to enhance pleated filter medium spacing and particulate carrying fluid stream flow therethrough.

2. The pleated filter medium arrangement of claim 1, with preselected strand portions of each insert fastened to at least one of the opposed faces of adjacent pleats.

3. The pleated filter medium arrangement of claim 1, said longitudinally extended spaced pleats of porous filter medium including adjacent pleats spaced proximate each other to optimize the number of pleats per unit area to maximize filter area capacity with the distance between opposed faces of said pleats being sufficient to allow ready nesting and engagement of said spacer inserts between adjacent pleats.

4. The pleated filter media arrangement of claim 1, said porous filter medium being glass fiber.

5. The pleated filter media arrangement of claim 1, said porous filter medium being natural fibers.

6. The pleated filter medium arrangement of claim 1, said spacer inserts being in corrugated tapered form for wedge-like insertion into said troughs.

7. The pleated filter medium arrangement of claim 1, said porous filter medium being synthetic material.

8. The pleated filter medium arrangement of claim 1, said porous filter medium being a combination of glass fiber and synthetic medium.

9. The pleated filter medium arrangement of claim 1, said porous spacer inserts being fastened to the upstream face of said porous filter medium.

10. The pleated filter medium arrangement of claim 1, said porous spacer inserts being fastened to the downstream face of said porous filter medium.

11. The pleated filter medium arrangement of claim 1, said porous spacer inserts being fastened to both the upstream and downstream faces of said opposed filter medium faces of said pleats.

12. The pleated filter medium arrangement of claim 1, each of said porous spacer inserts being sized and fastened to be in spaced relationship to an immediately successive crest of said filter medium pleats.

13. The pleated filter medium arrangement of claim 1, each of said porous spacer inserts being of synthetic material.

14. The pleated filter medium of claim 1, each of said porous spacer inserts including strands of a suitable selectively sheathed core of material having appropriate rigidity and bonding characteristics to provide stable pleat spacing and to allow bonding to the filter medium.

15. The pleated filter medium of claim 14, said strands being composed of a polypropylene core sheathed by a polyethylenevinyl acetate.

16. The pleated filter medium of claim 14, said strands being comprised of polypropylene core sheathed by a polyethylene material.

17. The pleated filter medium of claim 14, said strands being comprised of a synthetic material coated with an adhesive.

18. The pleated filter media arrangement of claim 1, each of said porous spacer inserts comprising a plurality of spaced parallel comparative cross-sectionally thinner strands of material joined together by a plurality of spaced parallel comparative cross-sectionally thicker strands of material extending transverse at a preselected angle to said spaced parallel comparative cross-sectionally thinner strands of material.

19. The apparatus of claim 18, said cross-sectionally thicker strands of material being tapered and extending substantially normal to the longitudinally extending crest lines of said pleats with the smaller, cross-sectional area extending proximate said crest lines.

20. The apparatus of claim 18, said cross-sectionally thinner and thicker strands being of the same material.

21. The apparatus of claim 18, said cross-sectionally thinner stands of material extending substantially parallel to the longitudinally extending crest lines of said pleats.

22. The apparatus of claim 18, said cross-sectionally thinner strands of material extending substantially normal to the longitudinally extending crest lines of said pleats.

23. The apparatus of claim 18, each of said porous screen like spacer inserts including a thermobondable plastic polymeric material.

24. The apparatus of claim 23, said thermobondable plastic material being polyethylene vinyl acetate and polypropylene bicomponent material.

25. The apparatus of claim 23, said polymeric material being heat bonded to said filter medium pleat faces.

26. A pleated filter medium arrangement for removing particulate matter from a fluid stream comprising: at least one continuous sheet of porous filter medium of preselected breadth advantageously in the range of six to seventy-two inches (6"–72") pleated into a plurality of longitudinally extending spaced pleats with valley depths in the range of one half to four inches (0.5"–4") with a spacing between adjacent pleat crests in the approximate range of zero point zero five to zero point five inches (0.05"–0.5"), a plurality of longitudinally extending porous, individual and separate spacer inserts including strands composed of extruded cores of polypropylene surrounded by a sheath of polyvinyl acetate, said spacer inserts being of a longitudinally extending length in the approximate range of six inches to seventy two inches (6"–72") with each spacer being thermobonded to a corresponding downstream face of each adjacent pleat so as to be in spaced relation from immediately preceding and successive crests on either side of said pleat a distance of approximately zero point one three inches (0.13"), each spacer being composed of crossing sets of inner thin and outer thick strands with the set of cross-sectionally thin strands being of an average cross-section thickness of one-tenth (1/10) to one half (1/2) the diameter of the outer thicker and larger strands set, the thin strands set being spaced from each other a distance of approximately one inch (1") and extending longitudinally parallel to said pleat crests along the substantial lengths thereof with said thin strands set being thermo-bonded to cross-sectionally thicker strands set, said thicker strands set being of an average thickness of one twenty-fourth of an inch (1/24") with the strands of the thicker strands set being spaced from each other a distance of approximately zero point five (0.5") inches with at least some of said strands of said thin set being thermo-bonded to an adjacent pleat face.

* * * * *